(12) United States Patent
Dennis et al.

(10) Patent No.: US 7,047,985 B2
(45) Date of Patent: May 23, 2006

(54) REMOVAL OF BLOCKAGES FROM PIPEWORK USING CARBAMATE AND NITRIC ACID TREATMENT STEPS

(75) Inventors: Iain Stewart Dennis, Leighton (GB); Phillip Antony Mayhew, Whitehaven (GB)

(73) Assignee: British Nuclear Fuels PLC, (GB)

( * ) Notice: Subject to any disclaimer, the term of this patent is extended or adjusted under 35 U.S.C. 154(b) by 0 days.

(21) Appl. No.: 10/510,248

(22) PCT Filed: Apr. 7, 2003

(86) PCT No.: PCT/GB03/01484

§ 371 (c)(1),
(2), (4) Date: Jul. 14, 2005

(87) PCT Pub. No.: WO03/088268

PCT Pub. Date: Oct. 23, 2003

(65) Prior Publication Data

US 2005/0268947 A1 Dec. 8, 2005

(30) Foreign Application Priority Data

Apr. 5, 2002 (GB) ................................. 0207876.4

(51) Int. Cl.
*B08B 9/027* (2006.01)
(52) U.S. Cl. ............... 134/22.11; 134/22.1; 134/22.12; 134/22.13; 134/22.16; 134/26; 134/28; 134/35; 510/188; 510/195; 510/209; 510/219
(58) Field of Classification Search ............... 134/22.1, 134/22.11, 22.12, 22.13, 22.16, 26, 28, 35; 510/188, 195, 209, 219
See application file for complete search history.

(56) References Cited

U.S. PATENT DOCUMENTS

| | | | | |
|---|---|---|---|---|
| 3,892,588 A | * | 7/1975 | Horne | 134/24 |
| 4,022,639 A | * | 5/1977 | Ueki | 134/2 |
| 4,155,869 A | * | 5/1979 | Durham | 252/180 |
| 4,180,469 A | * | 12/1979 | Anderson | 134/22.1 |
| 4,476,930 A | * | 10/1984 | Watanabe | 166/279 |
| 4,806,263 A | * | 2/1989 | Leathers et al. | 510/199 |
| 4,946,473 A | | 8/1990 | Johnson | |
| 5,225,340 A | * | 7/1993 | Nghiem et al. | 435/168 |
| 5,252,245 A | * | 10/1993 | Garabedian et al. | 510/427 |
| 5,275,752 A | * | 1/1994 | Hansen | 252/70 |
| 5,407,597 A | * | 4/1995 | Busch et al. | 252/389.23 |
| 5,569,410 A | * | 10/1996 | Distaso | 510/202 |
| 5,585,342 A | * | 12/1996 | Choy et al. | 510/433 |
| 6,010,669 A | | 1/2000 | Miola et al. | |
| 6,814,930 B1 | * | 11/2004 | Oldsberg et al. | 422/15 |
| 6,866,797 B1 | * | 3/2005 | Martin et al. | 252/389.23 |

FOREIGN PATENT DOCUMENTS

| | | |
|---|---|---|
| DE | 3429584 A1 | 4/1985 |
| DE | 4024909 A1 | 2/1992 |
| GB | 753 386 A | 7/1956 |
| JP | 2068192 A | 7/1990 |
| JP | 4-51959 A | 2/1992 |
| JP | 6-298605 A | 10/1994 |
| JP | 11005773 A | 12/1999 |
| RU | 1241710 A1 | 11/1994 |
| RU | 2146168 C1 | 3/2000 |

\* cited by examiner

*Primary Examiner*—Charles Boyer
(74) *Attorney, Agent, or Firm*—William A. Barrett; Moore & Van Allen PLLC

(57) ABSTRACT

The invention provides a method for the removal of contaminating materials from pipework, the contaminating materials comprising deposits on the pipework which cause a reduction in the effective internal diameter of the pipes and thereby effect a reduction in the rate of flow of a fluid through the pipework, the method comprising treating the contaminating materials with at least one carbamate salt. The methods is also suitable for the treatment of contaminating materials which have a particularly deleterious effect on fluid flow and comprise partial or total blockages of the pipework. The carbamate is preferably in the form of an aqueous solution, and a preferred carbamate salt is ammonium carbamate. The treatment may be carried out in the presence of an additive such as caesium carbonate or ammonium bicarbonate. Optionally the treatment may be accompanied by a pre-treatment or post-treatment with aid, this being followed by a water wash. The method finds particular application in the nuclear processing industry.

18 Claims, No Drawings

REMOVAL OF BLOCKAGES FROM PIPEWORK USING CARBAMATE AND NITRIC ACID TREATMENT STEPS

The present invention is concerned with a procedure for the removal of blockages which can occur in pipework during manufacturing operations and industrial processing. More specifically, the invention concerns a method for the removal of build-ups of solids which form in pipework, thereby causing significant operational difficulties.

Manufacturing and other industrial processes are often beset by problems which occur due to the formation of solid deposits within the pipework. Ultimately, such deposits may become sufficiently substantial to lead to blockage of the flow of processing material through the pipework and, in such extreme circumstances, of course, processing or manufacturing operations generally have to be curtailed to allow for removal of the offending blockage.

Consequently, it is accepted procedure to monitor the level of solids build-up in such cases in order that remedial action may be taken in order to remove the deposits before a blockage can occur, thereby preventing the loss of production which would otherwise occur, and the associated financial losses which would accrue. However, although detection of such build-ups of solid is clearly an important part of the preventative procedure, the ability to quickly, cheaply and efficiently remove the offending deposit is also a vital requirement if the viability of the industrial process is to be maintained. It is this aspect of the process which is the concern of the present invention.

The formation of solid deposits within pipework during industrial processing may occur as a consequence of various factors. For instance, a reaction may occur between materials in a solution being carried through the pipework, with the result that a product having poor or limited solubility in the solution is produced and this material then begins to precipitate from solution. Alternatively, some component in a solution may react with the pipework itself in order to give rise to material which is insoluble in the solution and is thereby deposited from solution. Perhaps most commonly with solutions, however, deposits of material occur simply because the material has somewhat limited solubility in the solution at the outset, and it deposits to an extent from solution as a result of this limited solubility; the formation of a deposit is thereby simply a result of crystallisation from solution, rather than being dependent on the outcome of some—possibly unforeseen—chemical reaction. Similarly, when pipework is being used for the transfer of suspensions, rather than solutions, deposition of material can occur when particles fall out of the suspension.

Clearly, the nature of the deposits which are encountered industrially varies widely, and the number of remedial techniques available for their removal is vast, although most are generally based on either mechanical methods, which physically loosen the deposits from the interior of the pipework by scraping, rubbing, or the like, or chemical techniques, which rely on supplying a liquid which is an efficient solvent for the material forming the deposit, in order to clean it away from the surface of the pipework. Methods which combine these two general approaches are often found to be particularly successful.

Although the range of available techniques known from the prior art is wide and varied and, in most situations commonly encountered in industry, well known methods may be employed to resolve problems which arise, there are still specific materials which, when they occur as deposits in pipework, cause particular difficulties in their removal due to their insolubility in a range of common solvents and their general intractability. It is to the materials which fall within this group that the present invention is directed.

The present inventors have commonly encountered deposits comprising inorganic salts having particularly low solubility levels in most solvents. Examples of such salts include, for example, phosphate, alkylphosphate, molybdate and phosphomolybdate salts; specific examples include the phosphate, butylphosphate, molybdate and phosphomolybdate salts of such as zirconium, tellurium, gadolinium, caesium, iron and uranium. Materials such as these are commonly found as components of waste and process streams in the nuclear industry.

Consequently, the present invention seeks to provide an efficient method for the removal of such materials, and thereby prevent the severe problems which can otherwise be caused as a consequence of the stubborn nature of the deposits that are formed in pipework, and the subsequent blockages that can be encountered. The method is especially directed towards the removal of deposits which are sufficiently substantial to cause a reduction in the effective internal diameter of a pipe, and thereby have the capability to cause a reduction in the rate of flow of a fluid through the pipework. Additionally, of course, the method is required to be capable of dealing with the more extreme situations wherein severe levels of depositions have occurred, such that a partial or complete blockage of the pipework has already occurred. Clearly, such eventualities can cause severe difficulties, and even lead to catastrophic failures, in industrial processes.

In view of the fact that the method of the present invention finds particular application when dealing with pipeline deposits encountered in the nuclear industry, the potentially toxic nature of the wash liquors which result from the cleaning operation are of obvious concern and it is important that safe, clean and efficient methods of disposal should be available for these waste products. Consequently, the invention also seeks to provide a method of removing these materials from pipework which does not lead to the generation of toxic or harmful waste streams or by-products.

Thus, according to the present invention, there is provided a method for the removal of contaminating materials from pipework, said contaminating materials comprising deposits on the pipework which comprise inorganic salts having low solubility levels, wherein said contaminating materials cause a reduction in the effective internal diameter of the pipes, and thereby effect a reduction in the rate of flow of a fluid through the pipework, the method comprising treating said contaminating materials with at least one carbamate salt.

In more extreme situations, said contaminating materials may have a particularly deleterious effect on fluid flow, and comprise partial or total blockages of the pipework.

Preferably, said carbamate salt comprises an aqueous solution of a carbamate salt. Most preferably, said carbamate salt comprises ammonium carbamate.

The method of the present invention may suitably be performed at room temperature, but the most effective results are achieved when the treatment is carried out at elevated temperatures, preferably above 40° C., most preferably in the region of 60° C. In the case of materials which are particularly difficult to remove, it is desirable that the treatment should be continued for an extended period of time, possibly for several hours. The removal of zirconium molybdate, for example, is preferably carried out by treatment with ammonium carbamate at 60° C. for at least two hours.

Typical concentrations of carbamate in solution are in the range of from 0.3M to 6.0M, with optimum results being achieved with solutions having a concentration of between 1.0M and 3.0M.

The efficiency of carbamate salts in achieving the removal of deposits from pipework and the unblocking of pipes is thought in part to be due to the liberation of carbon dioxide which occurs as a result of chemical reaction between acid which has become trapped in the deposited material and the carbamate. The generation of carbon dioxide in this way will assist in mechanically breaking up the deposit or blockage.

Particularly favourable results with certain solid deposits have been achieved when the method of the present invention is carried out in the presence of at least one suitable additive. Examples of additives which have shown advantageous properties include carbonate and bicarbonate salts, with caesium carbonate and ammonium bicarbonate proving to be especially useful in this context. Most preferable is a mixture of ammonium carbamate and caesium carbonate. Such additives are generally present at a concentration in solution which is in the range from about 0.1M to about1.0M, with the preferred concentration being around0.2M. A particularly useful combination has been found to be 0.6M ammonium carbamate with0.2M caesium carbonate.

In the case of certain particularly stubborn and insoluble materials, it is found that pre-treatment of the deposit or blockage with acid, followed by washing with water, prior to treatment with carbamate may, on occasions, prove beneficial. A preferred acid for this process is nitric acid. The acid is typically provided as a solution having a concentration of between 1M and 5M; generally, a roughly 2M solution is found to be most satisfactory. The pre-treatment with acid and subsequent water wash are most conveniently carried out at room temperature. However, elevated temperatures of up to around 60° C. may be employed, if necessary. Alternatively, the acid treatment may be carried out after the treatment with carbamate; in such cases, it is believed that the removal of materials which show limited solubility during the carbamate treatment is facilitated by the physical effects of bubble generation and effervescence resulting from the treatment of the deposit with acid.

Following treatment of the deposit or blockage according to the method of the present invention, there remains a carbamate wash liquor which, particularly in the case of the nuclear industry, requires subsequent disposal or treatment. Fortunately, it has been found that in such cases, after acidification, the wash effluents appear compatible with subsequent evaporation of the liquor, although the volume reduction may be limited due to the possible precipitation of ammonium nitrate. However, care is required during the neutralisation procedure in order to avoid uncontrolled foaming of the mixture.

Specific examples of the successful application of the present invention in the field of nuclear technology include the treatment of pipework used in the processing of Highly Active Liquor according to the following procedures:

Method 1

Treatment with aqueous solution comprising 0.3–1.0M ammonium carbamate and 0.2M caesium carbonate at 60° C. for 2 hours.

Method 2

(a) Treatment with 2.0M nitric acid at room temperature; followed by (b) Washing with water at room temperature; followed by (c) Treatment with 1.0M or 3.0M aqueous ammonium carbamate solution at 60° C. for 2 hours.

Method 3

(a) Treatment with 1.0M or 3.0M aqueous ammonium carbamate solution at 60° C. for 2 hours; followed by (b) Treatment with 2.0M nitric acid at room temperature; followed by (c) Washing with water at room temperature.

The invention claimed is:

1. A method for the removal of contaminating materials from pipework in the nuclear processing industry, said contaminating materials comprising deposits on the pipework which comprise inorganic salts having low solubility levels, wherein said contaminating materials cause a reduction in the effective internal diameter of the pipes and thereby effect a reduction in the rate of flow of a fluid through the pipework, the method comprising treating pipework used in the nuclear processing industry for the processing of Highly Active Liquor as follows:

(a) treating with 2.0M nitric acid at room temperature; followed by (b) washing with water at room temperature; followed by (c) treating with 1.0M or 3.0M aqueous ammonium carbamate solution at 60° C. for 2 hours.

2. The method of claim 1 wherein said inorganic salts are deposited from solutions or suspensions in contact with the pipework.

3. The method of claim 1 wherein said inorganic salts comprise phosphate, alkylphosphate, molybdate and phosphomolybdate salts.

4. The method of claim 3 wherein said salts comprise the phosphate, butylphosphate, molybdate and phosphomolybdate salts of zirconium, tellurium, gadolinium, caesium, iron and uranium.

5. The method of claim 1 wherein said contaminating materials result in the partial or total blockage of the pipework.

6. The method of claim 1 wherein said treatment is carried out in the presence of at least one additive.

7. The method of claim 6 wherein said additive comprises a carbonate or bicarbonate salt.

8. The method of claim 7 wherein said carbonate or bicarbonate salt comprises caesium carbonate or ammonium bicarbonate.

9. The method of claim 1 comprising the treatment of pipework used in the processing of Highly Active Liquor with an aqueous solution comprising 1.0M ammonium carbamate and further comprising 0.2M caesium carbonate at 60° C. for 2 hours.

10. A method for the removal of contaminating materials from pipework in the nuclear processing industry, said contaminating materials comprising deposits on the pipework which comprise inorganic salts having low solubility levels, wherein said contaminating materials cause a reduction in the effective internal diameter of the pipes and thereby effect a reduction in the rate of flow of a fluid through the pipework, the method comprising treating pipework used in the nuclear processing industry for the processing of Highly Active Liquor as follows:

(a) treating with 1.0M or 3.0M aqueous ammonium carbamate solution at 60° C. for 2 hours; followed by (b) treating with 2.0M nitric acid at room temperature; followed by (c) washing with water at room temperature.

11. The method of claim 10 wherein said inorganic salts are deposited from solutions or suspensions in contact with the pipework.

12. The method of claim 10 wherein said inorganic salts comprise phosphate, alkylphosphate, molybdate and phosphomolybdate salts.

13. The method of claim 12 wherein said salts comprise the phosphate, butylphosphate, molybdate and phosphomolybdate salts of zirconium, tellurium, gadolinium, caesium, iron and uranium.

14. The method of claim 10 wherein said contaminating materials result in the partial or total blockage of the pipework.

15. The method of claim 10 wherein said treatment is carried out in the presence of at least one additive.

16. The method of claim 15 wherein said additive comprises a carbonate or bicarbonate salt.

17. The method of claim 16 wherein said carbonate or bicarbonate salt comprises caesium carbonate or ammonium bicarbonate.

18. The method of claim 10 comprising treatment pipework used in the processing of Highly Active Liquor with an aqueous solution comprising 1.0M ammonium carbamate and further comprising 0.2M caesium carbonate at 60° C. for 2 hours.

* * * * *